United States Patent
Sholingar et al.

(10) Patent No.: US 12,103,530 B2
(45) Date of Patent: Oct. 1, 2024

(54) VEHICLE DATA AUGMENTATION

(71) Applicant: Ford Global Technologies, LLC, Dearborn, MI (US)

(72) Inventors: Gautham Sholingar, Sunnyvale, CA (US); Sowndarya Sundar, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1179 days.

(21) Appl. No.: 16/848,957

(22) Filed: Apr. 15, 2020

(65) Prior Publication Data

US 2021/0323555 A1    Oct. 21, 2021

(51) Int. Cl.
*B60W 30/18*    (2012.01)
*B60W 10/10*    (2012.01)
(Continued)

(52) U.S. Cl.
CPC ...... *B60W 30/18036* (2013.01); *B60W 10/10* (2013.01); *B60W 10/18* (2013.01);
(Continued)

(58) Field of Classification Search
CPC .......... B60W 30/18036; B60W 10/10; B60W 10/18; B60W 10/20; B60W 2420/42; B60W 2555/20; B60W 2300/14; B60W 60/001; B60W 2710/10; B60W 2710/18; B60W 2710/20; G05D 1/0212; G05D 1/0231; G06F 18/214; G06F 18/217; G06N 3/08;
(Continued)

(56) References Cited

U.S. PATENT DOCUMENTS 10,196,088 B2 *  2/2019  Lavoie ............... B62D 15/0285
10,318,889 B2    6/2019  Xu
(Continued)

FOREIGN PATENT DOCUMENTS

WO    2019053052 A1    3/2019

OTHER PUBLICATIONS

Generative Adversarial Networks for Hard Negative Mining in CNN-Based SAR-Optical Image Matching, Lloyd H. Hughes, Michael Schmitt, Xiao Xiang Zhu 2018 IGARSS 2018—2018 IEEE International Geoscience and Remote Sensing Symposium (Year: 2018).*

(Continued)

*Primary Examiner* — Jelani A Smith
*Assistant Examiner* — Paul A Castro
(74) *Attorney, Agent, or Firm* — Frank A. MacKenzie; Bejin Bieneman PLC

(57) ABSTRACT

A system, including a processor and a memory, the memory including instructions to be executed by the processor to receive one or more images from a vehicle, wherein a first deep neural network included in a computer in the vehicle has failed to determine an orientation of a first object in the one or more images. The instructions can include further instructions to generate a plurality of modified images with a few-shot image translator, wherein the modified images each include a modified object based on the first object. The instructions can include further instructions to re-train the deep neural network to determine the orientation of the first object based on the plurality of modified images and download the re-trained deep neural network to the vehicle.

20 Claims, 7 Drawing Sheets

(51) Int. Cl.
  *B60W 10/18*   (2012.01)
  *B60W 10/20*   (2006.01)
  *G05D 1/00*    (2006.01)
  *G06F 18/21*   (2023.01)
  *G06F 18/214*  (2023.01)
  *G06N 3/08*    (2023.01)
  *G06V 10/772*  (2022.01)
  *G06V 10/774*  (2022.01)
  *G06V 10/82*   (2022.01)
  *G06V 20/56*   (2022.01)
  *G06V 20/58*   (2022.01)

(52) U.S. Cl.
  CPC ........... *B60W 10/20* (2013.01); *G05D 1/0212* (2013.01); *G05D 1/0231* (2013.01); *G06F 18/214* (2023.01); *G06F 18/217* (2023.01); *G06N 3/08* (2013.01); *G06V 10/772* (2022.01); *G06V 10/7747* (2022.01); *G06V 10/82* (2022.01); *G06V 20/56* (2022.01); *G06V 20/584* (2022.01); *B60W 2420/403* (2013.01); *B60W 2555/20* (2020.02)

(58) Field of Classification Search
  CPC .. G06N 3/045; G06V 10/772; G06V 10/7747; G06V 10/82; G06V 20/56; G06V 20/584; G06T 7/70; G06T 2207/10004; G06T 2207/20081; G06T 2207/20084; G06T 2207/30252
  See application file for complete search history.

(56) References Cited

U.S. PATENT DOCUMENTS

| | | | |
|---|---|---|---|
| 11,448,753 B2* | 9/2022 | Rostami | G06N 3/088 |
| 2015/0379422 A1 | 12/2015 | Chandler | |
| 2018/0253608 A1* | 9/2018 | Diessner | G06V 10/462 |
| 2020/0026287 A1 | 1/2020 | Jiang et al. | |
| 2021/0303927 A1* | 9/2021 | Li | G06V 10/764 |
| 2021/0358095 A1* | 11/2021 | Arroyo | G06T 11/00 |

OTHER PUBLICATIONS

Liu, Ming-Yu, et al. "Few-shot unsupervised image-to-image translation." Proceedings of the IEEE/CVF international conference on computer vision. 2019. (Year: 2019).*

Liu et al., "Few-Shot Unsupervised Image-to-Image Translation", arXiv:1905.01723v2 [cs.CV] Sep. 9, 2019.

* cited by examiner

VEHICLE DATA AUGMENTATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
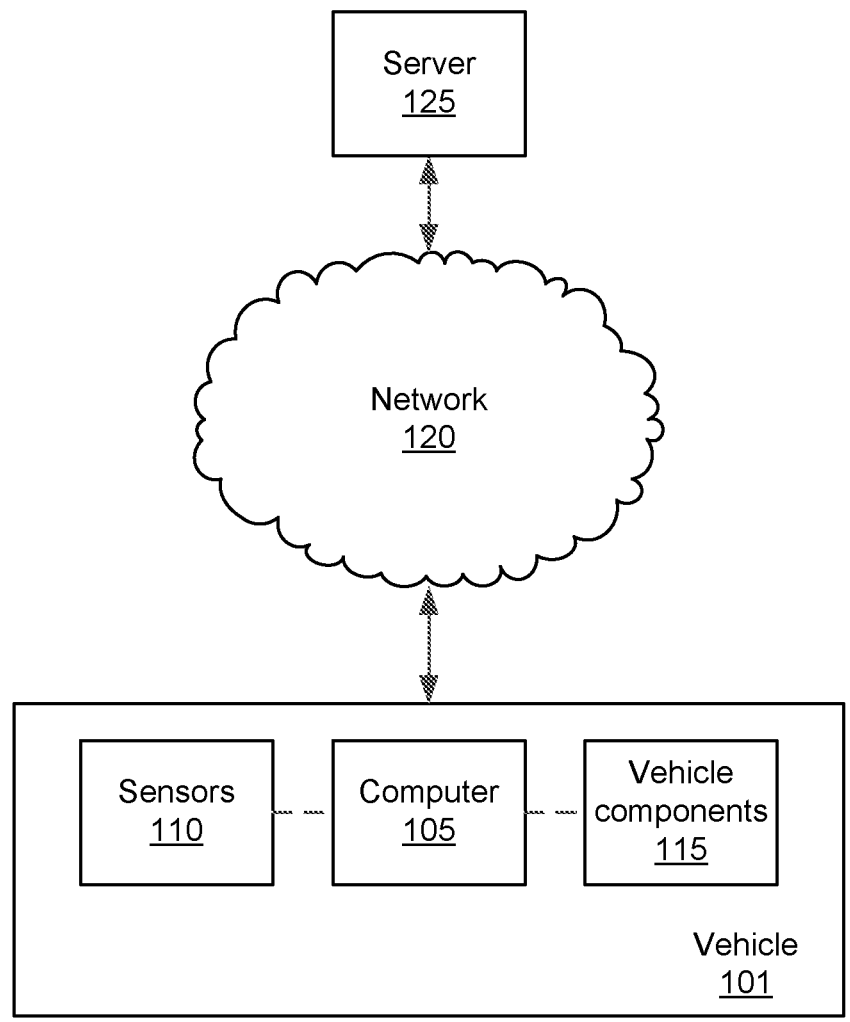
FIG. 1 is a diagram of an example traffic infrastructure system.

Vehicles can be equipped to operate in both autonomous and occupant operated mode. By a semi- or fully-autonomous mode, we mean a mode of operation wherein a vehicle can be operated partly or entirely by a computing device as part of a system having sensors and controllers. The vehicle can be occupied or unoccupied, but in either case the vehicle can be partly or completely operated without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A computer in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more objects such as a vehicle, a pedestrian, or a vehicle trailer in an environment around a vehicle. The data can be processed by a computer in the vehicle and can be used to operate the vehicle.

A computer in a vehicle can determine a vehicle path upon which to operate the vehicle by inputting vehicle sensor data to a deep neural network trained to identify and locate an object. For example, the deep neural network can be trained to determine an angle of a vehicle trailer with respect to a vehicle. The computer can use the angle data to determine a vehicle path that permits the vehicle to back up and park the trailer. The deep neural network can be trained based on a plurality of trailer types using sensor data acquired in a plurality of environmental conditions. In spite of training the deep neural network on a plurality of trailer types and a plurality of environmental conditions, it can happen that a new trailer type with new vehicle trailer components will be encountered in real-world operation. When this occurs, the deep neural network can fail to determine angle data regarding the new trailer type. Techniques discussed herein can use the sensor data corresponding to the failure to determine angle data regarding the new trailer type to generate a plurality of images based on the failure sensor data. The plurality of generated images can be used to re-train a deep neural network to determine angle data regarding the new trailer type in a plurality of environmental conditions. The re-trained deep neural network can be downloaded to the vehicle and used to operate the vehicle based on determining angle data regarding the new trailer type. Disclosed herein is method including receiving one or more images from a vehicle, wherein a deep neural network included in a computer in the vehicle has failed to determine an orientation of a first object in the one or more images, generating a plurality of modified images with a few-shot image translator, wherein the modified images each include a modified object based on the first object and re-training the deep neural network to determine the orientation of the modified object based on the plurality of modified images. The re-trained deep neural network can be downloaded to the vehicle. The few-shot image translator can be based on a generative adversarial network and is trained using a plurality of real-world images and a plurality of synthetic images to translate one or more input images into the plurality of modified images based on the one or more images from the vehicle. Training the few-shot image translator can be based on the plurality of real-world images and a plurality of synthetic images that include vehicle trailers and ground truth data regarding an angle of each vehicle trailer with respect to a vehicle for each real-world image, respectively. The plurality of real-world images and the plurality of synthetic images can include a plurality of weather and lighting conditions including daytime, nighttime, rain, snow, and a plurality of sunlight directions.

The plurality of vehicle trailers in the plurality of real-world images and the plurality of synthetic images can include a plurality of vehicle trailer types having a plurality of trailer components configured in a variety of configurations. The first object can be a vehicle trailer and determining the orientation of the first object can include determining an angle of a vehicle trailer with respect to a vehicle for each modified image, respectively. The plurality of modified images can each include ground truth data that includes a respective angle of a vehicle trailer with respect to a vehicle. Each modified image can include a vehicle trailer oriented at an angle with respect to a vehicle equal to an angle of an object occurring in an input image. Each modified object can be based on the first object includes vehicle trailer components included in the first object in a same configuration as the vehicle trailer components included in the first object. The deep neural network can include convolutional layers and fully-connected layers wherein the convolutional layers process input image data and the fully-connected layers process output from the convolutional layers to determine an angle of the object with respect to a vehicle. The few-shot image translator can include content encoder layers, class encoder layers and decoder layers wherein the content encoder layers generate latent residual features based on input object type and object orientation and the decoder layers generate an output image based the class encoder layers. The vehicle can be operated by inputting an image to the re-trained deep neural network to determine a trailer angle of an attached trailer. The vehicle can be operated by determining a vehicle path based on the input image including an attached trailer. The vehicle can be operated by commanding vehicle powertrain, vehicle steering and vehicle brakes to operate the vehicle along the vehicle path that applies forces to the attached trailer to move the attached trailer to a target location at a target orientation.

Further disclosed is a computer readable medium, storing program instructions for executing some or all of the above method steps. Further disclosed is a computer programmed for executing some or all of the above method steps, including a computer apparatus, programmed to receive one or more images from a vehicle, wherein a deep neural network included in a computer in the vehicle has failed to determine an orientation of a first object in the one or more images, generate a plurality of modified images with a few-shot image translator, wherein the modified images each include a modified object based on the first object and re-train the deep neural network to determine the orientation of the modified object based on the plurality of modified images. The re-trained deep neural network can be downloaded to the vehicle. The few-shot image translator can be based on a generative adversarial network and is trained using a plurality of real-world images and a plurality of synthetic images to translate one or more input images into the plurality of modified images based on the one or more images from the vehicle. Training the few-shot image translator can be based on the plurality of real-world images and a plurality of synthetic images that include vehicle trailers and ground truth data regarding an angle of each vehicle trailer with respect to a vehicle for each real-world image, respectively. The plurality of real-world images and the plurality of synthetic images can include a plurality of weather and lighting conditions including daytime, nighttime, rain, snow, and a plurality of sunlight directions.

The instructions can include further instructions wherein the plurality of vehicle trailers in the plurality of real-world images and the plurality of synthetic images can include a plurality of vehicle trailer types having a plurality of trailer components configured in a variety of configurations. The first object can be a vehicle trailer and determining the orientation of the first object can include determining an angle of a vehicle trailer with respect to a vehicle for each modified image, respectively. The plurality of modified images can each include ground truth data that includes a respective angle of a vehicle trailer with respect to a vehicle. Each modified image can include a vehicle trailer oriented at an angle with respect to a vehicle equal to an angle of an object occurring in an input image. Each modified object can be based on the first object includes vehicle trailer components included in the first object in a same configuration as the vehicle trailer components included in the first object. The deep neural network can include convolutional layers and fully-connected layers wherein the convolutional layers process input image data and the fully-connected layers process output from the convolutional layers to determine an angle of the object with respect to a vehicle. The few-shot image translator can include content encoder layers, class encoder layers and decoder layers wherein the content encoder layers generate latent residual features based on input object type and object orientation and the decoder layers generate an output image based the class encoder layers. The vehicle can be operated by inputting an image to the re-trained deep neural network to determine a trailer angle of an attached trailer. The vehicle can be operated by determining a vehicle path based on the input image including an attached trailer. The vehicle can be operated by commanding vehicle powertrain, vehicle steering and vehicle brakes to operate the vehicle along the vehicle path that applies forces to the attached trailer to move the attached trailer to a target location at a target orientation.

FIG. 1 is a diagram of a traffic infrastructure system 100 that includes a vehicle 101 operable in autonomous ("autonomous" by itself in this disclosure means "fully autonomous"), semi-autonomous, and occupant operated (also referred to as non-autonomous) mode. One or more vehicle 101 computing devices 105 can receive data regarding the operation of the vehicle 100 from sensors 110. The computing device 105 may operate the vehicle 101 in an autonomous mode, a semi-autonomous mode, or a non-autonomous mode.

The computing device 105 includes a processor and a memory such as are known. Further, the memory includes one or more forms of computer-readable media, and stores instructions executable by the processor for performing various operations, including as disclosed herein. For example, the computing device 105 may include programming to operate one or more of vehicle brakes, propulsion (e.g., control of acceleration in the vehicle 101 by controlling one or more of an internal combustion engine, electric motor, hybrid engine, etc.), steering, climate control, interior and/or exterior lights, etc., as well as to determine whether and when the computing device 105, as opposed to a human operator, is to control such operations.

The computing device 105 may include or be communicatively coupled to, e.g., via a vehicle communications bus as described further below, more than one computing devices, e.g., controllers or the like included in the vehicle 101 for monitoring and/or controlling various vehicle components 115, e.g., a powertrain controller, a brake controller, a steering controller, etc. The computing device 105 is generally arranged for communications on a vehicle communication network, e.g., including a bus in the vehicle 101 such as a controller area network (CAN) or the like; the vehicle 101 network can additionally or alternatively include wired or wireless communication mechanisms such as are known, e.g., Ethernet or other communication protocols.

Via the vehicle network, the computing device 105 may transmit messages to various devices in the vehicle and/or receive messages from the various devices, e.g., controllers, actuators, sensors, etc., including sensors 110. Alternatively, or additionally, in cases where the computing device 105 actually comprises multiple devices, the vehicle communication network may be used for communications between devices represented as the computing device 105 in this disclosure. Further, as mentioned below, various controllers or sensing elements such as sensors 110 may provide data to the computing device 105 via the vehicle communication network.

In addition, the computing device 105 may be configured for communicating through a vehicle-to-infrastructure (V-to-I) interface with a server 125, e.g., a cloud server or remote server computer, via a network 120, which, as described below, includes hardware, firmware, and software that permits computing device 105 to communicate with a server 125 via a network 120 such as wireless Internet (WI-FI®) or cellular networks. Computing device 105 may be configured accordingly including processors, memory, transceivers, etc., configured to utilize various wired and/or wireless networking technologies, e.g., cellular, BLUETOOTH® and wired and/or wireless packet networks. Computing device 105 may be configured for communicating with other vehicles 101 using vehicle-to-vehicle (V-to-V) networks, e.g., according to Dedicated Short Range Communications (DSRC) and/or the like, e.g., formed on an ad hoc basis among nearby vehicles 101 or formed through infrastructure-based networks via V-to-I communications. The computing device 105 also includes nonvolatile memory such as is known. Computing device 105 can log data by storing the data in nonvolatile memory for later retrieval and transmittal via a vehicle communication network to a server 125 or a user mobile device. Server computer 125 can also function as a computing device 105 included in a roadside infrastructure, or edge, computing node, where an edge computing node is a computing device 105 included in or on a stationary infrastructure element such as a pole, a bridge, a wall, building, etc., and that acquires sensor data and communicates with vehicles 101 via a V-to-I interface or the like in a local portion of one or more of a roadway, parking lot or parking structure, etc.

As already mentioned, generally included in instructions stored in the memory and executable by the processor of the computing device 105 is programming for operating one or more vehicle 101 components, e.g., braking, steering, propulsion, etc., without intervention of a human operator. Using data received in the computing device 105, e.g., the sensor data from the sensors 110, the server computer 125, etc., the computing device 105 may make various determinations and/or control various vehicle 101 components and/or operations without a driver to operate the vehicle 101. For example, the computing device 105 may include programming to regulate vehicle 101 operational behaviors (i.e., physical manifestations of vehicle 101 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller, a brake controller, and a steering controller. A controller may be an electronic control unit (ECU) such as is known, possibly including additional programming as described herein. The controllers may communicatively be connected to and receive instructions from the computing device 105 to actuate the subsystem according to the instructions. For example, the brake controller may receive instructions from the computing device 105 to operate the brakes of the vehicle 101.

The one or more controllers for the vehicle 101 may include known electronic control units (ECUs) or the like including, as non-limiting examples, one or more powertrain controllers, one or more brake controllers, and one or more steering controllers. Each of the controllers may include respective processors and memories and one or more actuators. The controllers may be programmed and connected to a vehicle 101 communications bus, such as a controller area network (CAN) bus or local interconnect network (LIN) bus, to receive instructions from the computing device 105 and control actuators based on the instructions.

Sensors 110 may include a variety of devices known to provide data via the vehicle communications bus. For example, a radar fixed to a front bumper (not shown) of the vehicle 101 may provide a distance from the vehicle 101 to a next vehicle in front of the vehicle 101, or a global positioning system (GPS) sensor disposed in the vehicle 101 may provide geographical coordinates of the vehicle 101. Vehicle location and orientation data can also be provided by an inertial measurement unit (IMU) sensor. An IMU includes accelerometers configured to record three-dimensional motion of a vehicle 101. The distance(s) provided by the radar and/or other sensors 110 and/or the geographical coordinates provided by the GPS and IMU sensors may be used by the computing device 105 to operate the vehicle 101 autonomously or semi-autonomously, for example.

The vehicle 101 is generally a land-based vehicle 101 capable of autonomous and/or semi-autonomous operation and having three or more wheels, e.g., a passenger car, light truck, etc. The vehicle 101 includes one or more sensors 110, the V-to-I interface, the V-to-V interface, the computing device 105 and vehicle components 115 including one or more controllers. The sensors 110 may collect data related to the vehicle 101 and the environment in which the vehicle 101 is operating. By way of example, and not limitation, sensors 110 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 110 may be used to sense the environment in which the vehicle 101 is operating, e.g., sensors 110 can detect phenomena such as weather conditions (precipitation, external ambient temperature, etc.), the grade of a road, the location of a road (e.g., using road edges, lane markings, etc.), or locations of target objects such as neighboring vehicles 101. The sensors 110 may further be used to collect data including dynamic vehicle 101 data related to operations of the vehicle 101 such as velocity, yaw rate, steering angle, engine speed, brake pressure, oil pressure, the power level applied to vehicle components 115 in the vehicle 101, connectivity between vehicle components 115, and accurate and timely performance of vehicle components 115.

Figure 2:
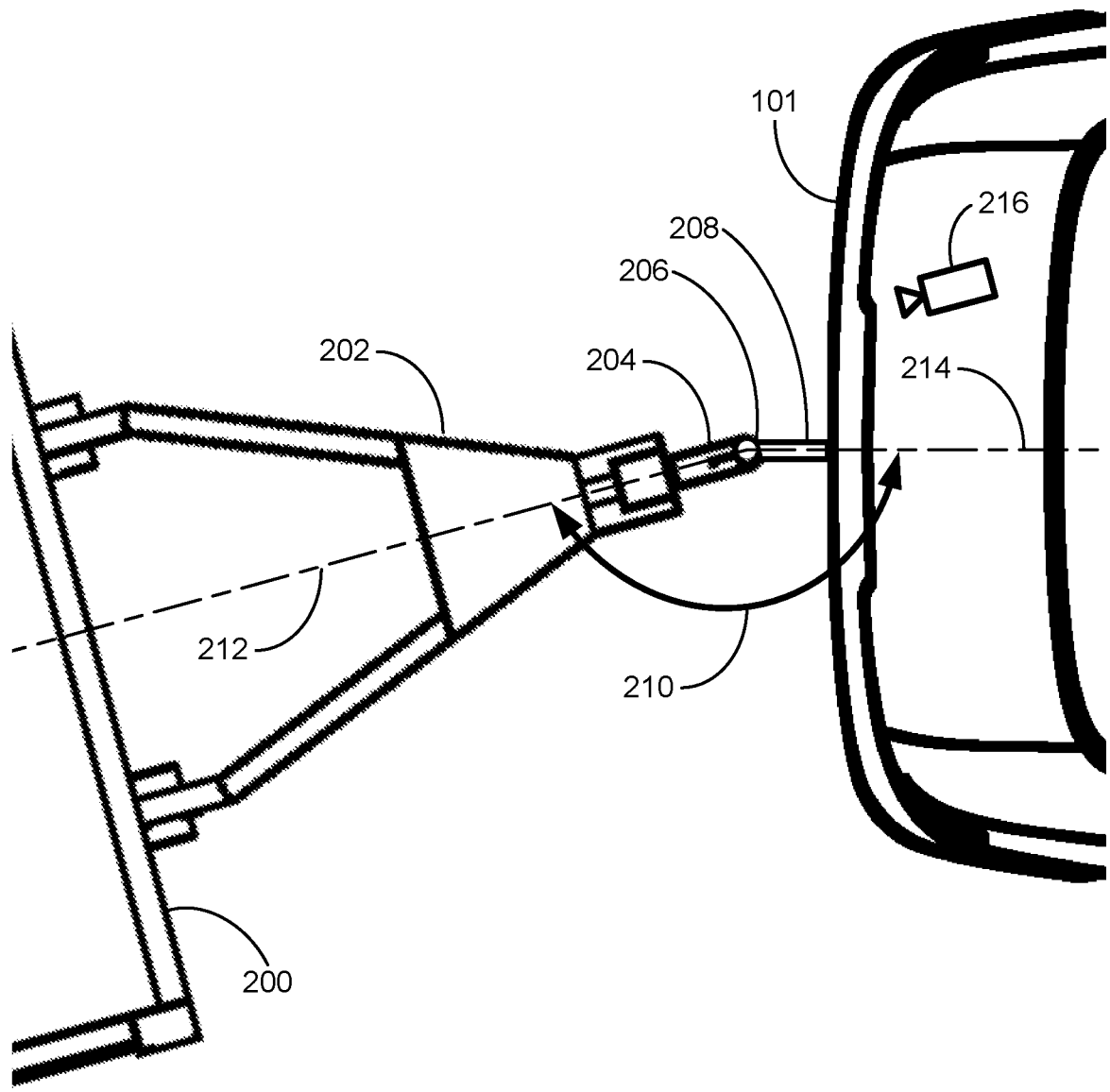
FIG. 2 is a diagram of an example vehicle trailer.

FIG. 2 is a diagram of a trailer 200 attached to a vehicle 101. A trailer 200 is an unpowered vehicle towable by a vehicle 101. The trailer 200 includes a tongue 202 that includes a trailer coupler 204. The trailer coupler 204 connects the trailer 200 to the vehicle 101 by placing the trailer coupler 204 over a trailer ball 206 to removably connect the trailer coupler 204 to the trailer ball 206. The trailer ball 206 is attached to the vehicle 101 by a ball mount 208. The orientation of a trailer 200 with respect to a vehicle 101 to which it is connected can be described by a trailer angle 210. Trailer angle 210 is defined as the angle that a trailer centerline 212 makes with respect to a vehicle centerline 214.

The trailer centerline 212 and vehicle centerline 214 are respectively lines (sometimes referred to as axes) corresponding to horizontal longitudinal centers of a trailer 200 or vehicle 101, respectively, i.e., centerlines 212, 214 are parallel to a ground surface, typically a roadway that supports the trailer 200 and vehicle 101. Accordingly, a trailer centerline 212 is determined by constructing a line through the geometric center of a top-down image of the trailer 200 and a lateral center of the trailer coupler 204, i.e., the trailer centerline 212 runs fore-aft through the trailer 200, presuming that the trailer 200 is or can be treated as substantially rectangular (i.e., a geometric rectangle can be fitted to represent the trailer 200), points of the centerline 212 being determined a lateral center of the trailer 200, i.e., the centerline 212 bisects the trailer 200 in a fore-aft direction. Similarly, a vehicle centerline 214 is determined by constructing a line that passes through the lateral center of a top-down image of the vehicle 101, treating the vehicle 101 as substantially rectangular, the centerline 214 further passing through the trailer ball 206 connected to the vehicle 101. The trailer angle 210 is determined by the angle of the trailer centerline 212 and the vehicle centerline 214; the vertex of the angle 210 is formed by an intersection of the trailer centerline 212 and the vehicle centerline 214 at the center of the trailer ball 206.

The trailer angle 210 of a trailer 200 attached to a vehicle 101 can be determined by a computer 105 in a vehicle 101 to operate the vehicle 101 with an attached trailer 200. A trailer angle 210 can be estimated by processing an image of a trailer 200 and used to operating a vehicle 101 with an attached trailer 200 in reverse, for example. Determining a trailer angle 210 of an attached trailer 200 can permit a computer 105 in a vehicle 101 to determine commands to be sent to vehicle 101 steering components that will cause the vehicle 101 towing the trailer 200 to back the trailer 200 into a selected location, for example a parking spot.

A video sensor 216 can be included in a vehicle 101. The video sensor 216 can be oriented to provide a field of view that includes a view of a trailer 200 including the trailer coupler 204, the ball mount 208 attached to the vehicle 101, and an environment on either side of the trailer 200. In some examples a second video sensor 216 can be included to acquire images including more of the environment on both sides of the trailer 200 and a third video sensor 216 can be included to acquire images from the back of the trailer 200. A computer 105 can determine, based on images 300 acquired by the video sensor 216 of a target location for the trailer 200 such as a location of a parking spot, dock, or ramp, e.g., a location for parking and/or loading or unloading a trailer 200. A target location can be determined by processing the image 300 with a deep neural network, for example. Based on a determined target location and a determined trailer angle 210, a computer 105 can determine a vehicle path upon which to operate the vehicle 101 that will cause the attached trailer 200 to turn in the appropriate direction at the appropriate rate to position the trailer at the target location. As is known, reversing a vehicle 101 with a trailer 200 attached can cause the trailer to turn in a direction opposite to the direction the vehicle 101 is turning. Because of this the vehicle path determined by computer 105 to move the trailer 200 into the target location can require both forward and reverse motion of the vehicle 101, for example.

Figure 3:
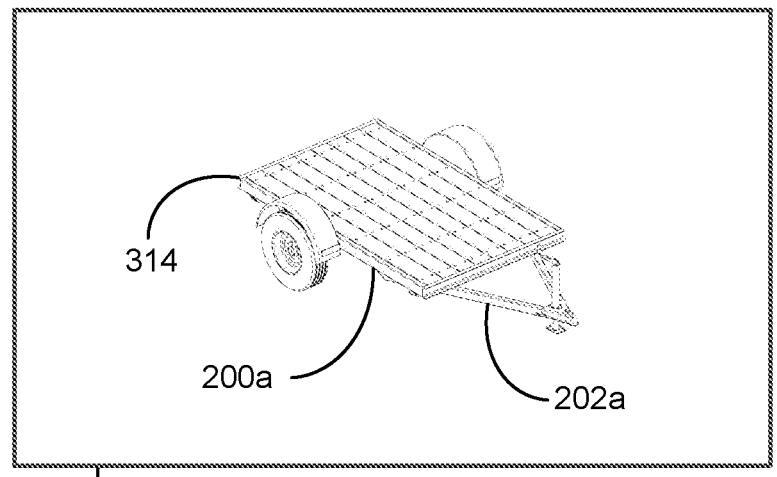
FIG. 3 is a diagram of two example vehicle trailers.
Figure 3:
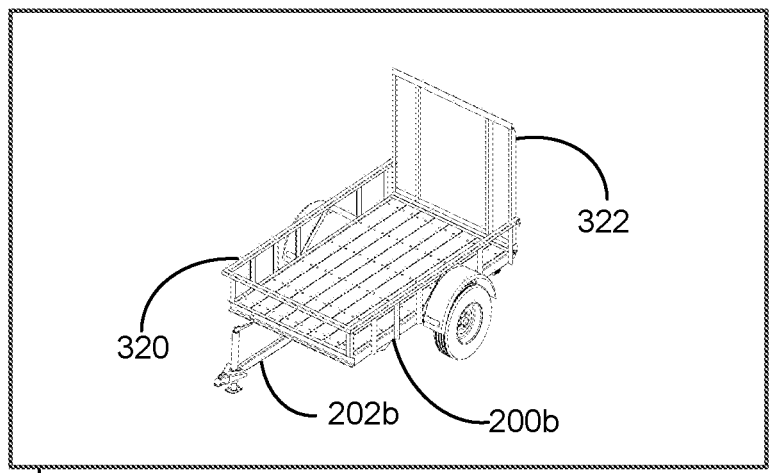

FIG. 3 is a diagram of two video images 300a, 300b (collectively images 300), where each video image 300 is acquired by a video sensor 216 included in a vehicle 101. Each video image 300 includes a respective image of a trailer 200a, 200b (collectively trailers 200). Trailers 200 can have a plurality of different components configured in a plurality of different configurations. A trailer component herein refers to a conventional trailer component, such as a tongue, a bed, a wheel, etc. In video image 300a trailer 200a is configured with an A-frame tongue 202a, while in video image 300b trailer 200b is configured with a straight tongue 202b. Trailer 200a is configured with a flat-bed 314 having no sides or gate, while trailer 200b is configured with sides 320 and a ramp-gate 322. Trailers can also be configured to carry a plurality of different cargo. Cargo can range from materials like dirt or stone, boxes, furniture, and machinery. Cargo can include vehicles such as tractors, automobiles, and boats. Different types of cargo can require different configurations of trailer 200 components and can change the appearance of a trailer 200 in video images. Changing the appearance of trailers 200 in video images, e.g., because different trailers have different components, can cause a computer 105 to fail to recognize the trailer 200.

Differing configurations and appearances of trailer components can present challenges in determining trailer angles 210 with respect to a vehicle 101. Trailer angles 210 can be determined by processing images 300 with a deep neural network, as will be discussed below in relation to FIG. 3. Determining a trailer angle 210 with a deep neural network based on a real-world image can depend upon having trained the deep neural network with a training dataset that includes images of trailers 200 configured with components in the same configuration as the trailer 200 in the real-world image. Having trailer cargo that is different than the trailer cargo included in training images can cause the deep neural network to fail to determine trailer angle. Success in determining a trailer angle 210 is defined as determining a trailer angle 210 within +/−5 degrees of a trailer angle 210 that would be obtained by measuring the trailer angle 210 in the real world with physical instruments, for example rulers and protractors. Measuring the trailer angle 210 with physical instruments can be used as ground truth for training deep neural networks. Failure in determining a trailer angle 210 includes a deep neural network being unable to determine a trailer angle 210 at all for a given input image.

Determining a trailer angle 210 based on an input image 300 is typically made even more difficult by varying environmental conditions. An image 300 can include a plurality of environmental conditions, including lighting and weather. Lighting conditions can range from daytime to nighttime and all conditions in between. Sunlight can cast shadows and introduce highlights that vary depending upon the sunlight direction with respect to the trailer 200. Weather conditions can include rain, snow, and fog, etc. Success in determining trailer angles 210 can be increased by training the deep neural network with images 300 that include environmental conditions that will be encountered when processing images 300 acquired while operating in the real world.

Techniques discussed herein can improve the performance of a computer 105 included in vehicle 101 in determining trailer angles 210, 216. These techniques include storing a plurality of images 300 corresponding to failure to determine a trailer angle 210 by a first deep neural network included in computer 105 in a vehicle 101. The stored images are communicated to a cloud-based computer and used to train a few-shot image translator as defined and described below in relation to FIG. 5 to generate a plurality of training images that correspond to the trailer 200 configuration occurring in the failure images 210, 216. The training images are used to re-train a deep neural network to determine trailer angles 210 based on the trailer 200 configuration occurring in the failure images 210. The re-trained deep neural network is downloaded to a computer 105 in a vehicle 101 to be used to input vehicle sensor 216 images including images of trailers 200 and determine trailer angles 210. The vehicle 101 can then operate using the re-trained deep neural network. In examples where a computer 105 in a vehicle 101 includes a deep neural network that failed to determine a trailer angle 210, the re-trained deep neural network can be used in place of the first deep neural network.

Figure 4:
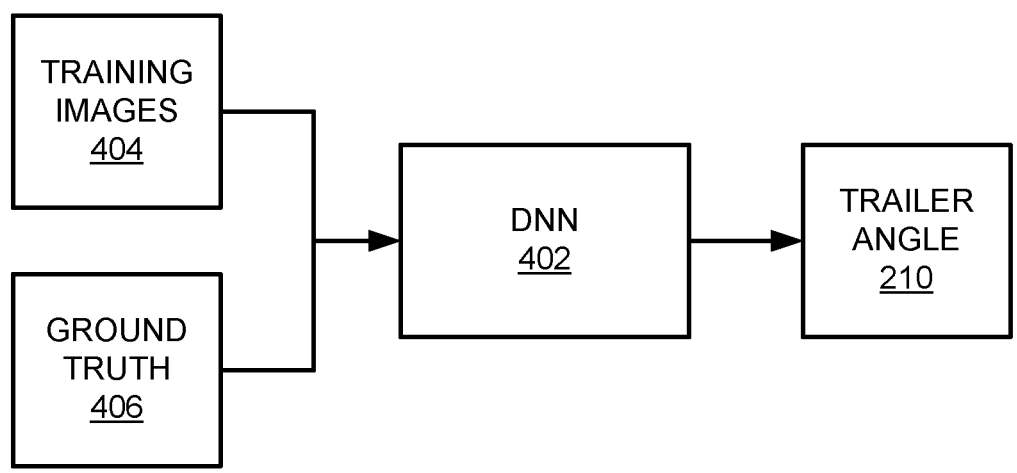
FIG. 4 is a diagram of an example system to train a deep neural network.

FIG. 4 is a diagram of a deep neural network system 400. Deep neural network system 400 includes a deep neural network 402, training images 404, ground truth 406 corresponding to the training images 404, and trailer angles 210 output from the deep neural network 402. The deep neural network 402 can include a plurality of convolutional layers that process input image data including training images 404 and a plurality of fully-connected layers that process the output from the convolutional layers. Deep neural network 402 can input training images 404 data from a video sensor 216 included in a vehicle 101, or synthetic training images 404 generated by photorealistic rendering software. In this example a video sensor 216 is configured to provide a field of view that includes a trailer 200 as discussed above in relation to FIG. 2. First deep neural network 402 is trained by processing training images 404 that include a trailer 200 to estimate a trailer angle 210, 216.

First deep neural network 402 is trained by processing a dataset that includes a large number (>1000) of training images 404 that include a plurality of trailer 200 types in a plurality of environmental conditions. Each image in the dataset has corresponding ground truth 406 that specifies a trailer angle 210 of the trailer 200 in the image. Ground truth 406 is data regarding a training image 404 that is determined by a process independent from the deep neural network 402. Ground truth 406 is deemed to represent a measurement of the real world. For example, a ground truth 406 trailer angle 210 can be estimated by manual inspection of the image, i.e., estimating a trailer angle 210 in image data using instruments including rulers and protractors on training image 404 hard copies, for example. In other examples, ground truth 406 trailer angle 210 can be estimated by measuring the trailer angle 210 in the real-world using instruments such a rulers and protractors on the real-world vehicle 101 and trailer 200 being imaged by the video sensor 216. In training, an trailer angle 210 from processing an input training image 404 is backpropagated and compared to the ground truth 406 corresponding to the input training image 404. Backpropagation can compute a loss function based on the trailer angle 210 and corresponding ground truth 406. A loss function is a mathematical function that maps a value such as a trailer angle 210 into a real number that corresponds to a cost. In this example the cost can be determined as the difference in degrees between the determined trailer angle 210 and the trailer angle 210 in the corresponding ground truth 406. The loss function determines how closely the trailer angle 210 matches the ground truth and is used to adjust the parameters or weights that control the deep neural network 402.

Parameters controlling deep neural network 402 processing are varied until output trailer angle 210 results match the ground truth 406 for each of the plurality of training images 404 in the training dataset. As will be understood from various applications of image or pattern recognition using neural networks, parameters or weights include the coefficients of convolution kernels used to extract features from input image data. Parameters or weights also include coefficients used by linear and/or non-linear equations included in fully-connected layers. Fully-connected layers process extracted image features output by convolutional layers. Training a deep neural network 402 typically includes systematically varying these parameters or weights and comparing the output results to a desired result corresponding to the ground truth 406. As a result of varying the parameters or weights over a plurality of trials over a plurality of input images, a set of parameters or weights that achieve a result that matches the ground truth can be determined.

The number of training images 404 in the training dataset can be increased by generating synthetic images that include trailers 200 using photorealistic rendering software. Photorealistic is defined as appearing to an observer as if they were viewing a picture of a real-world scene. Photorealistic rendering software is a software program that can create an image that appears as if it were acquired by a real-world camera viewing a real-world scene. Example photorealistic rendering software is Unreal Engine, produced by Epic Games, Cary, NC 27518.

Photorealistic rendering software inputs data describing a scene in mathematical format. For example, a trailer 200 to be rendered can be described as a collection of geometric shapes and surface textures. Each trailer type can have a different collection of geometric shapes and surface textures. A location and orientation of each trailer 200 to be rendered is also specified. The location and orientation of each trailer 200 can be transformed into a trailer angle 210 by specifying a location and field of view of a virtual camera that is used to determine the rendering process. The trailer angle 210 determined by the input data to the photorealistic rendering software is the ground truth data to be used with the output image data to train a deep neural network 402.

Image data output from a photorealistic rendering software program can be input to a generative adversarial network to increase the number and realism of images in the dataset of training images. A generative adversarial network is a neural network that includes a generative network that modifies input images and a discriminator network that is trained to determine whether a modified image is similar to a real image. Image similarity can be determined by comparing images using image subtraction, where a first image is subtracted from a second image and the absolute or squared differences between the two images are summed. Small absolute or squared differences (<1% of total summed pixel values) indicate similar images. Image similarity can also be determined based on correlation techniques that correlate regions of a first image with regions of a second image. High correlation (>90%) between the two images indicate similar images. The generative adversarial network is trained to modify input synthetic images realistically enough to be determined as "real" by the discriminator network. A generative adversarial network can be trained to modify an input image to simulate the effects of different environmental conditions. For example, a generative adversarial network can be trained to modify a synthetic image of a trailer rendered in full sunlight to appear as if it was raining when the photorealistic image was generated. A generative adversarial network can also increase the realism of synthetic images by adding visual features to the synthetic image to make it appear as if it were acquired with a real-world video sensor 216.

As discussed above in relation to FIG. 2, differing appearances of trailers 200 in images 300 used for training can cause the deep neural network 402 to fail to determine a trailer angle 210, 216. When computer 105 determines that the deep neural network 402 has failed to determine a trailer angle 210, 216, the first action that computer 105 can take is to store the image 300 that caused the failure and acquire a second image 300 from vehicle sensors. The second image 300 is processed by the first deep neural network 302 to determine whether the problem was a temporary problem with the first image 300 or whether the second image 300 also causes a failure. If the second image 300 also causes a failure to determine a trailer angle 210, 216, the second image 300 is stored by the computer 105 and a third image 210 is acquired and processed. If the third image 200, 205 also causes a failure, the third image 200, 205 is stored by the computer 105 and the process of acquiring and processing images 200, 205 can be repeated a plurality of times (>10) to ensure that the failure is persistent and to acquire a plurality of images including a trailer 200 that cause the deep neural network 402 to fail.

Figure 5:
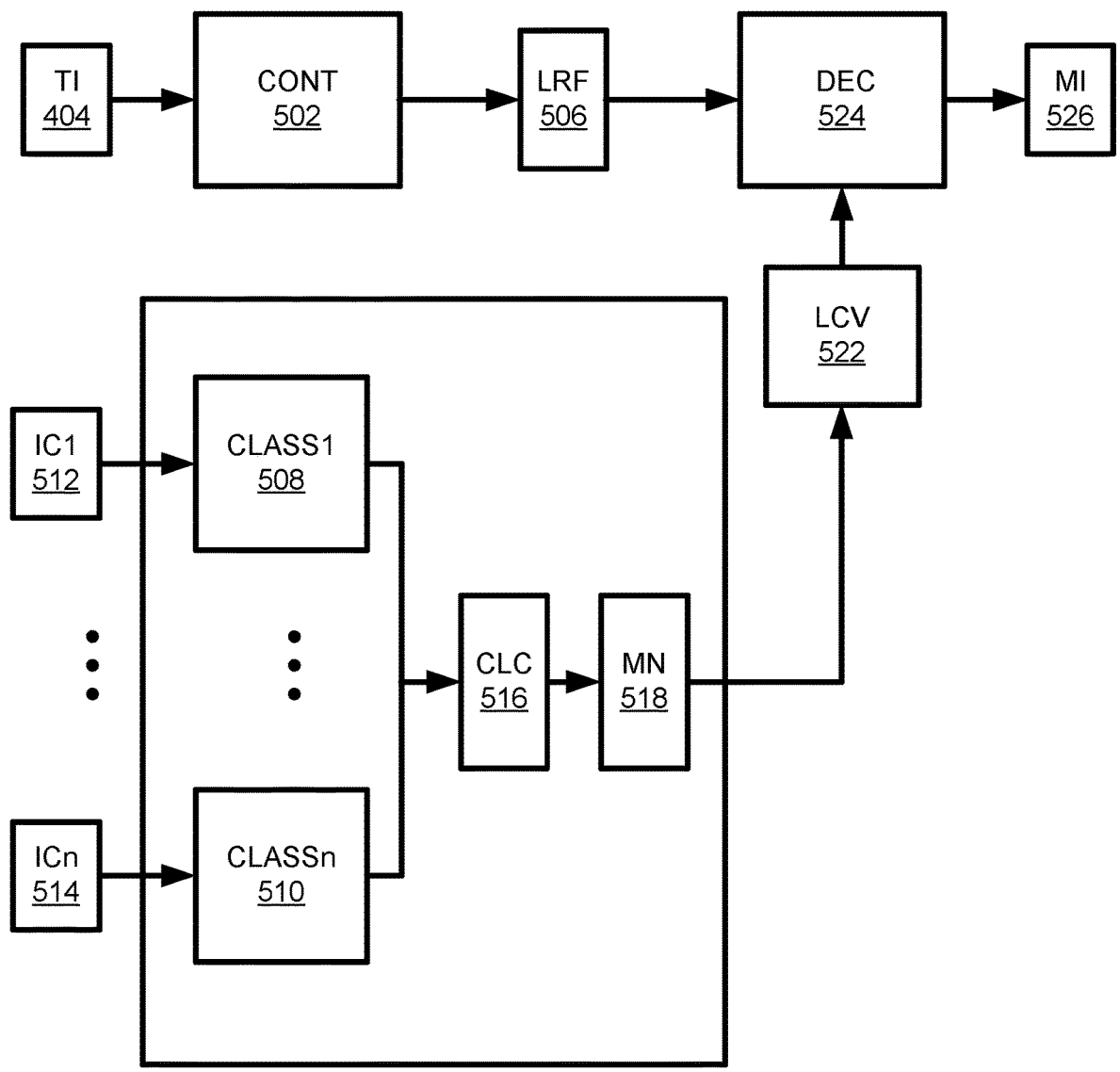
FIG. 5 is a diagram of a few-shot image translator.

FIG. 5 is a diagram of a few-shot image translator 500. A few-shot image translator 500 is a type of generative adversarial network that is modified to permit the few-shot image translator 500 to be trained with a training dataset that includes a plurality of image classes 1 through n (IC1, ICn) 512, 514. An image class is defined as a set of images where each image includes a trailer 200 with a same configuration at a plurality of trailer angles 210 in a plurality of environmental conditions. Each image class 512, 514 is input to a class encoder (CLASS1, CLASSn) 508, 510. The class encoders 508, 510 are neural networks that each include convolutional encoder layers followed by an average pooling layer. Each class encoder 508, 510 outputs content latent codes that correspond to the trailer 200 configurations in encoded format. The content latent codes (CLC) 516 are input to a mean processor (MN) 518 that determines a mean and variance of the content latent codes 516. Mean processor outputs latent class vectors (LCV) 522 that include the mean and variance of each of the content latent codes 516.

At training time, output latent class vectors 522 determined based on image classes 512, 514 in the training dataset are sent to the decoder (DEC) 524. The latent class vectors 522 are processed with a plurality of fully-connected neural networks in the decoder 524 to form parameters to be used by an affine transform processor in the decoder 524. Test input images (IN) 504 are input to a content encoder (CONT) 502 that encodes the content of the test input images 504 and outputs latent residual features (LRF) 506. The content encoder 502 includes a plurality of convolutional content encoder layers. Latent residual features 506 are data that correspond to trailer 200 components as described above in relation to FIGS. 2 and 3. Latent residual features 506 are output as a feature map that encodes the locations of the latent residual features 506 into a 16×16 array.

Decoder 524 includes decoder layers that perform an affine transform on the latent residual to map the features included in the latent residual features 522 into a format corresponding to the class latent vector. An affine transform includes translation, rotation and scale operations applied to the 16×16 array. The affine transform operation maps the latent residual features 522 extracted from an input image 504 into image features corresponding to one of the image classes 512, 514, where the parameters applied to the translation, rotation and scale are determined by training. At training time, the output modified image (MI) 526 is back propagated to compare to the input training image 404 and the image classes 512, 514. The output modified image 526 is tested by comparing the trailer angle 210 to the trailer angle of the input image 504 while comparing the trailer components in the output modified image 526 to the trailer components in one of the image classes 512, 514. When the few-shot image translator 500 is finished training, an output modified image 526 will include objects at a same object orientation as objects in the input training image 404.

The few-shot image translator 500 is pre-trained with known image classes to obtain satisfactory image translation quality. The few-shot image translator 500 is then re-trained by inputting stored images 300 uploaded from a computer 105 in a vehicle 101 that correspond to failure to determine a trailer angle 210 by a first deep neural network 302 by replacing one of the source image classes 512, 514 with a new class composed of images from the unseen failure images. The few shot image translator 500 is pre-trained against known source image classes to achieve satisfactory image translation quality for known trailer 200 classes. After this pre-training the failure or unseen images are used to fine-tune or retrain the few-shot image translator 500 as a new class. The failure or unseen images are used to retrain the already pre-trained few shot image translator network 500. This re-trains the few-shot image translator 500 to map input images 504 into the feature space corresponding to the stored images 300. Input images 504 corresponding to a plurality of trailer angles 210 and a plurality of environmental conditions are input to the few-shot image translator 500. After retraining the few-shot image translator 500 is capable of generating modified images 526 for the trailer 200 images corresponding to the failure images. Modified images 526 include images of trailers 200 at a plurality of trailer angles 210 in a plurality of environmental conditions corresponding to the input image 504 trailer angles and environmental conditions while including the features of the trailers in the stored images 200, 205. The output modified images 526 are used as a second training dataset for a second deep neural network 610.

Figure 6:
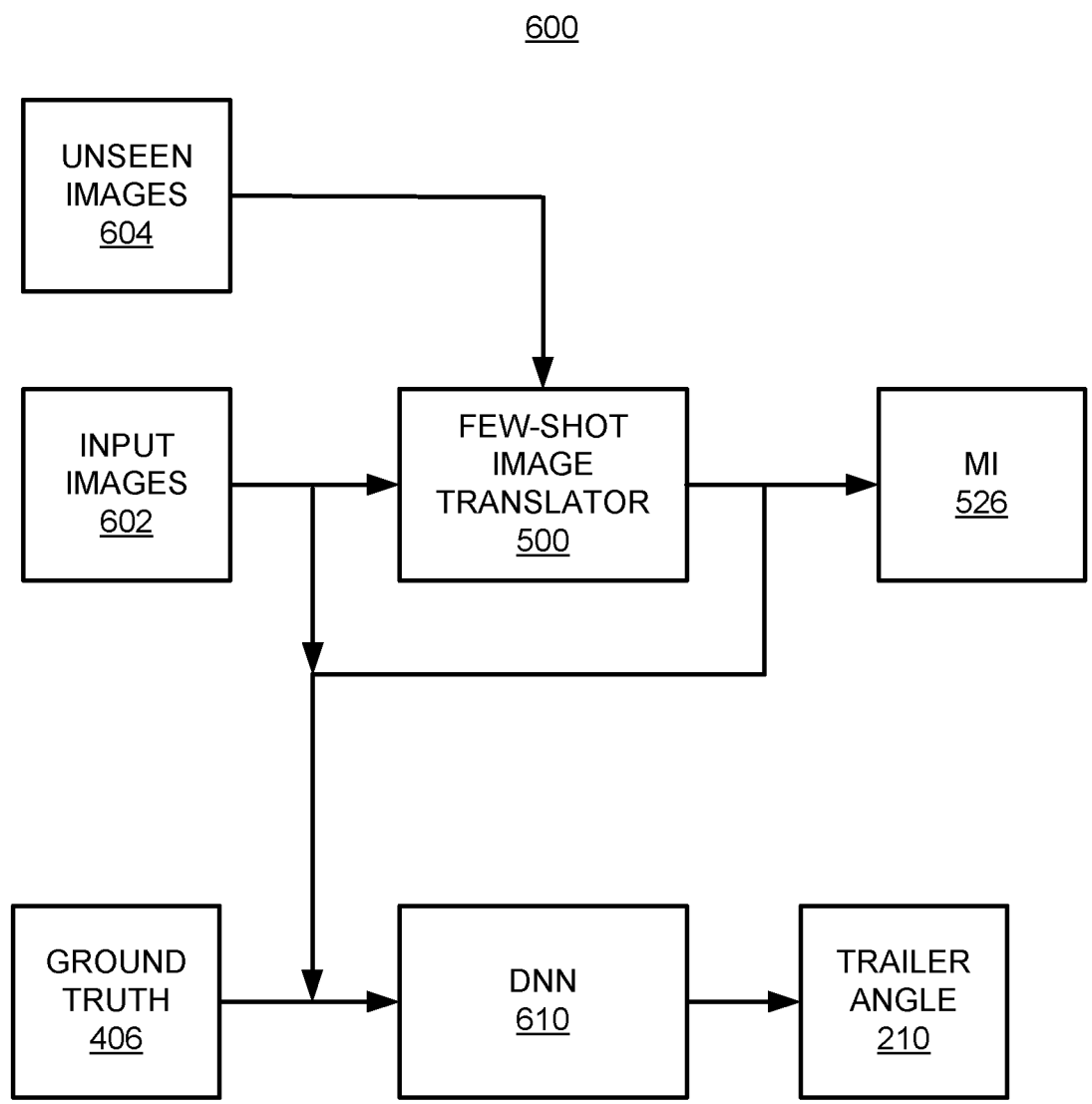
FIG. 6 is a diagram of a system to retrain a deep neural network with a few-shot image translator.

FIG. 6 is a diagram of a deep neural network re-training system 600. Deep neural network retraining system 600 includes a few-shot image translator (FEW-SHOT IMAGE TRANSLATOR) 500 and a deep neural network (DNN) 610. The deep neural network 610 can be a copy of the deep neural network 402 included in a vehicle 101. Deep neural network 610 can be a software program executing on a cloud-based computer for example server 125 that communicates with computer 105 included in a vehicle 101 via a network 120. Training the deep neural network 610 with the output modified images 526 can re-train the original deep neural network 610 to determine trailer angles 210 in images that include trailers 200 with components from the images 300 corresponding to failures by the first deep neural network 302. Images 300 corresponding to failures by the first deep neural network 302 are input to the few-shot image translator as unseen images (UNSEEN IMAGES) 604. Unseen images 604 are input to few-shot image translator 500 as input class images 512, 514 to train the few-shot image translator 500 to modify input training images 404 to include image features, for example trailer components and environmental conditions that make them appear as if they were unseen images 604.

Training images 404 are included in the training dataset used to train the deep neural network 402. Because the training images 404 and are taken from the training dataset, training images 404 will include corresponding ground truth 406 regarding the trailer angle 210. Few-shot image translator 500 translates training images 404 into output images 512 while preserving ground truth 406 corresponding to in each training image 404. Few-shot image translator modifies the appearance of each input training image 404 to match the appearance of unseen images 604, while preserving the trailer angle 210 in the training images 404. The output modified image 526 can be matched to the ground truth corresponding to the input training image 404 that generated the output modified image 526, thereby providing ground truth for training the re-trained deep neural network 610.

When the computer 105 has acquired and stored a plurality of images that cause the deep neural network 402 to fail to determine a trailer angle 210, 216, the stored plurality of images is input to a few-shot image translator 500 as unseen images 604. A few-shot image translator 500 is a software program executing on a cloud-based management computing device computer, for example server 125. It can be accessed by computer 105 in a vehicle 101 via a network 120. A few-shot image translator 500 can input the unseen images 604 that include a new configuration of trailer 200 that was not included in training images 404 used to train the first deep neural network 402. The few-shot image translator 500 can then, in response to training images 404 from the training dataset, output a plurality of second training dataset of modified images 526 that include trailers 200 configured like the new configuration of trailer 200 at a plurality of trailer angles 210 corresponding to the training images 404 in the first training dataset. The modified images 526 output from the few-shot image translator 500 are referred to as modified images 526 because training images 404, as discussed below in relation to FIG. 5, are processed by the few-shot image translator 500 to change the appearance of trailers 200 in the input training images 404 based on unseen images 604.

The second training dataset, including modified images 526 that include images of trailers 200 modified to appear in the new configuration, can be added to the first training dataset and used to re-train the original deep neural network 610. The re-trained deep neural network 610 is a software program executing on a cloud-based management computer, for example server 125. The re-trained deep neural network 610 is a copy of the first deep neural network 302. Re-training the original deep neural network 610 to determine trailer angles 210, 216 using both the training images 404 and the modified images 526 permits the re-trained deep neural network 610 to determine trailer angles 210 for all of the trailers 200 in both the training images 404 and the modified images 526.

Following training with both training images 404 and the modified images 526, the re-trained deep neural network 610 can be downloaded via the network 120 to a computer 105 in a vehicle 101 to determine trailer angles 210 based on input images 300 acquired by a video sensor 216 included in the vehicle. In examples where computer 105 does not include a deep neural network 402, downloading the re-trained deep neural network corresponds to a first installation. In examples where a computer 105 in a vehicle 101 includes a first deep neural network 402, the re-trained deep neural network 610 corresponds to an update of the deep neural network 402 and replaces the deep neural network 402. Replacement can be accomplished by replacing the parameters or weights that are the programming data for a deep neural network 402. Because the re-trained deep neural network 610 was trained using both the training images 404 and the modified images 526, the re-trained deep neural network 610 can successfully determine trailer angles 210 for trailer 200 configurations including new trailer 200 configurations that caused the deep neural network 402 to fail.

Figure 7:
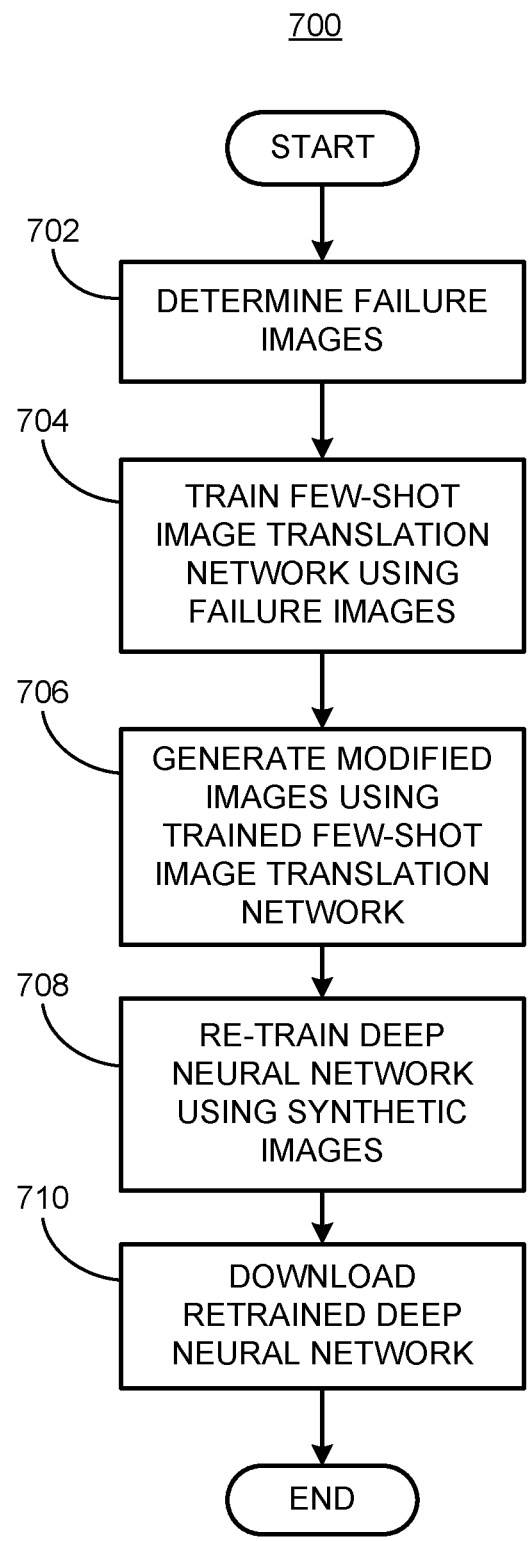
FIG. 7 is a flowchart diagram of an example process to re-train a deep neural network.

FIG. 7 is a flowchart diagram of a process 700 for retraining a re-trained deep neural network 610 and downloading it to a vehicle 101. Process 700 can be implemented by a processor of a computing device, taking as input information from sensors, and executing commands, and outputting object information, for example. Process 700 includes multiple blocks that can be executed in the illustrated order. Process 700 could alternatively or additionally include fewer blocks or can include the blocks executed in different orders.

Process 700 begins at block 702, where a first deep neural network 302 included in a vehicle 101 stores unseen images 604 corresponding to failures to determine a trailer angle 210 in images 300 acquired by a video sensor 216 included in the vehicle 101.

At block 704 a computer 105 in the vehicle 101 uploads the unseen images 604 to a few-shot image translator 500. The few-shot image translator 500 inputs the unseen images 604 as an image class 512, 513 which trains the few-shot image translator 500 to modify input images to match the appearance of the unseen images 604. Matching the appearance of the unseen images 604 includes modifying input images to include trailer 200 components included in the unseen images 604.

At block 706 few-shot image translator 500 generates modified images 526 by inputting training images 404 and translating the training images 404 into modified images 526 as discussed above in relation to FIGS. 5 and 6. The output modified images 526 will include trailers 200 having trailer angles 210 that match the trailer angles 210 in the input images 504 while including trailer 200 components that match the trailer 200 components in the unseen images 604.

At block 708 the output modified images 526 are combined with the ground truth 406 from the training images 404 to train a re-trained deep neural network 610. The output modified images 526 are combined with the training images 404 to train the re-trained deep neural network 610 to determine trailer angles 210 in both the training images 404 and the modified images 526. In this fashion, the re-trained deep neural network 610 will be trained to process all of the trailer 200 types recognized by the deep neural network 402 plus the new trailer 200 types corresponding to the unseen images 604 that caused the deep neural network 402 to fail.

At block 710 the re-trained deep neural network 610 is downloaded to a computer 105 included in a vehicle 101. The re-trained deep neural network 610 can be used by the computer 105 to successfully determine trailer angles 210 for trailer 200 types including trailer 200 types that caused the first deep neural network 302 to fail. In examples where computer 105 does not include a first deep neural network 402, downloading the re-trained deep neural network corresponds to a first installation. In examples where a computer 105 in a vehicle 101 includes a first deep neural network 402, the re-trained deep neural network 610 corresponds to an update of the deep neural network 402 and replaces or reprograms the deep neural network 402.

The re-trained deep neural network 610 can input an image 404 that includes a trailer 200 and determine a trailer angle 210. The computer 105 can use the determined trailer angles 210 to determine a vehicle path for operating the vehicle that locates an attached trailer 200 in a determined target location as discussed above in relation to FIG. 2. For example, computer 105 can determine a target location and orientation for a trailer 200 based on processing an input image 300. The target location can be a parking spot or a ramp, for example. Computer 105 can use a kinematic simulation program or the like to predict motion of a trailer 200 in response to motion of the towing vehicle 101. A kinematic simulation program uses mathematical models of trailers 200 and vehicles 101 to simulate the motion of a trailer 200 in response to applied forces based on a starting trailer angle 210. Computer 105 can determine a vehicle path that applies forces to a trailer 200 to move the trailer 200 into a target location at a target orientation based on the starting trailer angle 210. Computer 105 can transmit commands to vehicle powertrain, vehicle steering and vehicle brakes to operate the vehicle 101 on the vehicle path and thereby apply the determined forces to the trailer 200 and move it to the target location at the target orientation. Following block 710 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Computer 105 can be a computer 105 as described above or may include a dedicated electronic circuit including an ASIC that is manufactured for a particular operation, e.g., an ASIC for processing sensor data and/or communicating the sensor data. In another example, computer 140 may include an FPGA which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 105.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a management computing device including:
   a processor; and
   a memory, the memory including instructions executable by the processor to:
   receive one or more images from a vehicle, wherein a deep neural network included in a computer in the vehicle has failed to determine an orientation of a first object in the one or more images;
   generate a plurality of modified images with a few-shot image translator, wherein the modified images each include a modified object based on the first object, and wherein the few-shot image translator is a generative adversarial network and is trained using a plurality of real-world images and a plurality of synthetic images;
   re-train the deep neural network to determine the orientation of the first object based on the plurality of modified images wherein the first object is a vehicle trailer; and
   output the re-trained deep neural network.

2. The system of claim 1, wherein the few-shot image translator is trained to translate one or more input images into the plurality of modified images based on the one or more images from the vehicle.

3. The system of claim 2, the instructions including further instructions to train the few-shot image translator based on the plurality of real-world images and the plurality of synthetic images that each include vehicle trailers and ground truth data regarding an angle of each respective vehicle trailer with respect to the vehicle.

4. The system of claim 3, wherein the plurality of real-world images and the plurality of synthetic images include a plurality of weather and lighting conditions including daytime, nighttime, rain, snow, and a plurality of sunlight directions.

5. The system of claim 4, wherein the plurality of vehicle trailers in the plurality of real-world images and the plurality of synthetic images include a plurality of vehicle trailer types having a plurality of trailer components configured in a variety of configurations.

6. The system of claim 1, wherein determining the orientation of the vehicle trailer includes determining an angle of the vehicle trailer with respect to the vehicle for each modified image, respectively.

7. The system of claim 1, wherein the plurality of modified images each include ground truth data that includes a respective angle of the vehicle trailer with respect to the vehicle.

8. The system of claim 1, wherein each modified image includes the vehicle trailer oriented at an angle with respect to the vehicle equal to an angle of an object occurring in an input image.

9. The system of claim 1, wherein each modified object based on the vehicle trailer includes vehicle trailer components included in the vehicle trailer in a same configuration as the vehicle trailer components included in the vehicle trailer.

10. The system of claim 1, wherein the deep neural network includes convolutional layers and fully-connected layers wherein the convolutional layers process input image data and the fully-connected layers process output from the convolutional layers to determine an angle of the vehicle trailer with respect to the vehicle.

11. The system of claim 1, wherein the few-shot image translator includes content encoder layers, class encoder layers and decoder layers wherein the content encoder layers generate latent residual features based on input object type and object orientation and the decoder layers generate an output image based the class encoder layers.

12. The system of claim 1, the instructions including further instructions to output the re-trained deep neural network to the vehicle and operate the vehicle by inputting an image to the re-trained deep neural network to determine a trailer angle of an attached vehicle trailer.

13. The system of claim 12, the instructions including further instructions to operate the vehicle by commanding vehicle powertrain, vehicle steering and vehicle brakes to operate the vehicle along a vehicle path that applies forces to the attached vehicle trailer to move the attached vehicle trailer to a target location at a target orientation.

14. A method, comprising:
receiving one or more images from a vehicle, wherein a deep neural network included in a computer in the vehicle has failed to determine an orientation of a first object in the one or more images;
generating a plurality of modified images with a few-shot image translator, wherein the modified images each include a modified object based on the first object, and wherein the few-shot image translator is a generative adversarial network and is trained using a plurality of real-world images and a plurality of synthetic images;
re-training the deep neural network to determine the orientation of the first object based on the plurality of modified images wherein the first object is a vehicle trailer; and
outputting the re-trained deep neural network.

15. The method of claim 12, wherein the few-shot image is trained to translate one or more input images into the plurality of modified images based on the one or more images from the vehicle.

16. The method of claim 13, further comprising training the few-shot image translator based on the plurality of real-world images and the plurality of synthetic images that include vehicle trailers and ground truth data regarding an angle of each respective vehicle trailer with respect to the vehicle.

17. The method of claim 14, wherein the plurality of real-world images and the plurality of synthetic images includes a plurality of weather and lighting conditions including daytime, nighttime, rain, snow, and a plurality of sunlight directions.

18. The method of claim 15, wherein the plurality of vehicle trailers in the plurality of real-world images and the plurality of synthetic images includes a plurality of vehicle trailer types having a plurality of trailer components configured in a variety of configurations.

19. The method of claim 12, wherein determining the orientation of the vehicle trailer includes determining an angle of the vehicle trailer with respect to the vehicle for each modified image, respectively.

20. The method of claim 12, wherein the plurality of modified images each include ground truth data that includes a respective angle of the vehicle trailer with respect to the vehicle.

* * * * *